United States Patent [19]

Machado et al.

[11] Patent Number: 5,418,657
[45] Date of Patent: * May 23, 1995

[54] TRACK ADDRESS DETECTING MEANS BY HDD SECTOR SERVO METHOD

[75] Inventors: Michael G. Machado, San Jose; Ronald R. Moon, Los Gatos; Richard K. Oswald; Avraham Perahia, both of San Jose, all of Calif.

[73] Assignee: Alps Electric Co., Ltd., Tokyo, Japan

[ * ] Notice: The portion of the term of this patent subsequent to Jul. 23, 2009 has been disclaimed.

[21] Appl. No.: 276,272

[22] Filed: Nov. 23, 1988

[51] Int. Cl.⁶ .......................... G11B 5/09; G11B 15/18
[52] U.S. Cl. ........................ 360/40; 360/49; 360/72.2
[58] Field of Search ............... 360/72.2, 49, 40

[56] References Cited

U.S. PATENT DOCUMENTS

| | | | |
|---|---|---|---|
| 4,164,763 | 8/1979 | Briccetti et al. | 360/40 |
| 4,424,543 | 1/1984 | Lewis et al. | 360/135 |
| 4,669,004 | 5/1987 | Moon et al. | 360/77 |

*Primary Examiner*—David J. Severin
*Assistant Examiner*—Won Tae C. Kim
*Attorney, Agent, or Firm*—Guy W. Shoup; B. Noel Kivlin

[57] ABSTRACT

A disk file subsystem is disclosed which utilizes a track address decoding circuit which converts the track address which is recorded on the magnetic media in Gray code according to a 1/6 (2,8) run-length-limited recording code to its corresponding binary track address.

8 Claims, 7 Drawing Sheets

| DATA | CODE |
|---|---|
| 0 | 010 000 |
| 1 | 000 010 |

|  | HAVE | | NEXT |
|---|---|---|---|
| CASE 1 | | | |
| DATA | "0" | | "0" |
| CODE | 010 000 ↑ | 6T | 010 000 ↑ |
| CASE 2 | | | |
| DATA | "0" | | "1" |
| CODE | 010 000 ↑ | 9T | 000 010 ↑ |
| CASE 3 | | | |
| DATA | "1" | | "0" |
| CODE | 000 010 ↑ | 3T | 010 000 ↑ |
| CASE 4 | | | |
| DATA | "1" | | "1" |
| CODE | 000 010 ↑ | 6T | 000 010 ↑ |

FIG. 5

TRACK ADDRESS DETECTING MEANS BY HDD SECTOR SERVO METHOD

BACKGROUND OF THE INVENTION

1. Field of the Invention

This invention relates to the field of digital recording and more particularly to an improved recording medium for use in digital magnetic recording and to circuitry for providing numerical track address information from digital information on a recording medium.

2. Description of the Prior Art

In data recording, and in magnetic data recording wherein a plurality of tracks are utilized to store information on a peripheral device, it is required that the track address be recorded so that information can be stored and retrieved from an identifiable location. In many types of digital data storage peripheral devices such as disk drives, the location information for the stored data is located on the same surface as the data being stored and in sectors, this being generally referred to in the art as utilizing embedded servo technique since the identification of the track, as well as other information such as the sector number, track number and head number, are recorded on the media preceding each portion of the disk in that sector which is set aside for recording user data. The identity of the track over which the magnetic recording head is located is required for storing and retrieving data since the host computer to which the peripheral device is connected will command that information be stored or retrieved from a specified location. In addition, in modern disk drives, when the drive is powered down the magnetic recording head is moved to an area where data is not stored and thus when a drive is started from rest position, the actuator is not located over a recording track and the head must be moved over a recording track, the head location must then be read and processed to provide the disk storage subsystem with the location of the head as a reference point for use in storing or retrieving information based on commands from the host computer.

One approach used in the prior art of providing track address information is illustrated in U.S. Pat. No. 4,424,543 entitled "Method and Apparatus for Recording Transducer Positioning Information", issued to Lewis et al. Jan. 3, 1984. In the Lewis et al. patent, tracks on the magnetic recording medium are grouped in bands of sixteen-each, with each track within a band being numbered 0 through 15. Identification of tracks within a band are written on the disk directly in Gray code without being encoded as is done in many prior art systems. With the approach illustrated in Lewis et al., it is only possible to tell which track within a band has been found and the absolute track address is not obtainable directly from the information on the track over which the head is then positioned. Other information must be utilized to identify the absolute track address. Another disadvantage with the Lewis et al. type of track address identification system is that a data separator, also sometimes referred to as a phase-locked-loop, is required and prior to reading the track address from the disk the data separator must be synced by a signal recorded ahead of the track address in the sector. This not only takes additional space from the disk which could otherwise be devoted to storage of user data, it also requires additional circuitry.

Another approach utilized to provide track address information in an embedded servo system as illustrated in U.S. Pat. No. 4,669,004 to Moon et al., issued May 26, 1987, and entitled "High Capacity Disk File with Embedded Sector Servo". In Moon et al., the track address is written in each of four burst signals located at different radial positions to eliminate need for phase coherence for each of the tracks on the disk and is encoded in a 1, 7 recording code. In addition, immediately preceding the track address information in each of the burst signals is a burst preamble and sync signal which is required to synchronize the data separator in order to decode the track address information. In the Moon et al. device, the user data is also encoded in the 1, 7 recording code. The Moon et al. system has the disadvantage of requiring a data separator, as well as requiring space on the disk for a signal to synchronize the data separator. In addition, upon start-up of the drive when the head is located over a track which is yet unidentified, the problem arises of distinguishing the track address information from user data since both are recorded on the disk in the same recording code.

SUMMARY OF THE INVENTION

It is an object of this invention to provide a track address encoding and decoding method and apparatus for implementing the encoding and decoding which is reduced in complexity and which provides the ability to detect the track address more readily than is possible utilizing the prior art systems.

It is a further object of this invention to provide track address decoding circuitry which operates without the need for a data separator.

It is yet another object of this invention to provide a unique format, which unambigiously detects the beginning of sector for use in recording digital data on a recording medium.

It is an additional object of the present invention to provide a data recording format in which the track address is recorded on the recording medium in a first recording code and the user data storage locations are recorded on the recording medium in a second recording code.

It is an additional object of the present invention to provide an improved recording and reproducing medium for use in a system for storing and retrieving digital data in which the medium has track location information and user data information stored in such a way as to make track address identification simpler and more reliable than that used in the prior art.

It is a further object of the present invention to provide circuitry for decoding digital data recorded on a recording medium using a 1/6 (2,8) run-length-limited recording code.

In accordance with one feature of the invention, a circuit for receiving track address information comprised of digital signals from a recording medium and converting said information into a numerical track address, wherein said track address information includes track address origin information, said circuit comprises: first circuit means having an input for receiving said track address information and a plurality of output terminals each one of which is designated to exclusively provide an output signal indicative of the time interval since the receipt of the preceding digital signal, said first circuit means further including means for measuring the relative time interval between said digital signals and providing an output signal to the one of said plurality of output terminals corresponding to the measured interval; translation circuit means having a plurality of input terminals connected to the output terminals of said first circuit means, said translation circuit having a plurality of output terminals, said translation circuit including means for grouping predetermined ones of said input terminals of said translation circuit with respect to one or more output terminals of said translation circuit so that an output signal is provided on one or more of said output terminals in response to receipt of a signal on an input terminal of one of said input terminals in its corresponding group; track address synchronization information detecting means having input terminals connected to output terminals of said translation circuit and having an output terminal, said track address synchronization information detecting means including means responsive to receipt of signals from said translation circuit to provide an output signal at its output terminal indicative of receipt of track address synchronization information; and track address decoder circuit means having a plurality of input terminals, means connecting one of said input terminals to the output terminal of said track address synchronization information detecting means and means connecting others of said plurality of input terminals to predetermined ones of the output terminals of said translation circuit, whereby in response to receipt of a signal from said track address synchronization information detecting means and receipt of signals from said translation circuit means the track address decoder circuit generates the numerical track address represented by the digital signals from said recording medium.

In accordance with another feature of the invention, the circuit as set forth above provides a numerical track address by decoding track address information recording on said recording medium according to a run-length-limited recording code.

In accordance with yet another feature of the invention, the recording code utilized for recording the numerical track address on the recording medium is a 1/6 (2,8) code.

In accordance with yet another feature of the present invention, a recording and reproducing medium is provided for use in a system for storing and retrieving data in a plurality of tracks on said medium wherein each track has a track address field which includes track address information recorded in said track address field and each track has user data location information recorded in at least one location on each respective track, and further wherein said track address information is recorded on said medium according to a first recording code and said user data location information is recorded on said medium according to a second recording code.

In accordance with a further feature of the invention, in a recording and reproducing medium as provided above the track address field includes a track address origin field preceding the track address information.

In accordance with another feature of the invention, the track address field in the recording and reproducing medium is recorded on said medium according to the first recording code.

In a further feature of the invention, the recording and reproducing medium utilizes as the first recording code a 1/6 (2,8) run-length-limited recording code.

BRIEF DESCRIPTION OF THE DRAWINGS

Other objects and advantages of the invention will become apparent from a study of the specification and drawings, in which:

FIG. 5 is a decoding diagram for the 1/6 (2,8) recording code, and such diagram is utilized in the explanation of how the 1/6 (2,8) recording code is decoded;

DESCRIPTION OF THE PREFERRED EMBODIMENT

Figures 1, 4:
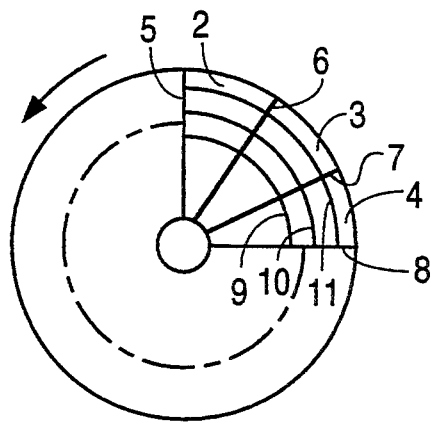
FIG. 1 is a plan view of a magnetic disk illustrating the arrangements of sectors and tracks on the disk surface.
FIG. 4 illustrates the data bit to code bit conversion utilized in the 1/6 (2,8) run-length-limited recording code utilized when encoding the track address mark, an index bit and the track address in each sector of the disk.

The present invention relates to the storage of digital information and will be described in connection with storage of digital information on a magnetic recording disk, however, the invention is not limited to use with magnetic recording. With respect to the preferred embodiment, the invention is illustrated in connection with its use in the storage of digital information in sectors on a magnetic disk. Referring to FIG. 1, magnetic disk 1 includes a coating of magnetic materials on the surface which is divided into sectors indicated by reference characters 2, 3 and 4, with the dividing line of the sectors noted by radial lines 5, 6, 7 and 8. As is well known in the disk file field, a plurality of tracks, three of which are indicated at 9, 10 and 11, are spaced concentrically about the center of disk 1, these tracks being utilized for storing digital information and being addressable by one or more magnetic heads not shown. In the preferred embodiment of the present invention, disk 1 is divided into seventy-two sectors and each sector is addressable separately. Radially across the disk the track address information in each sector is recorded phase coherently. This is further illustrated in FIG. 3. Each of the tracks has the same number of sectors. For storing and retrieving data it is necessary to identify the location of the information based on the sector number as well as the track number, and to be able to move from a current track to a desired track. In a type of system to be described herein, each sector is uniquely identifiable and is formatted as illustrated in FIG. 2.

Figure 2:
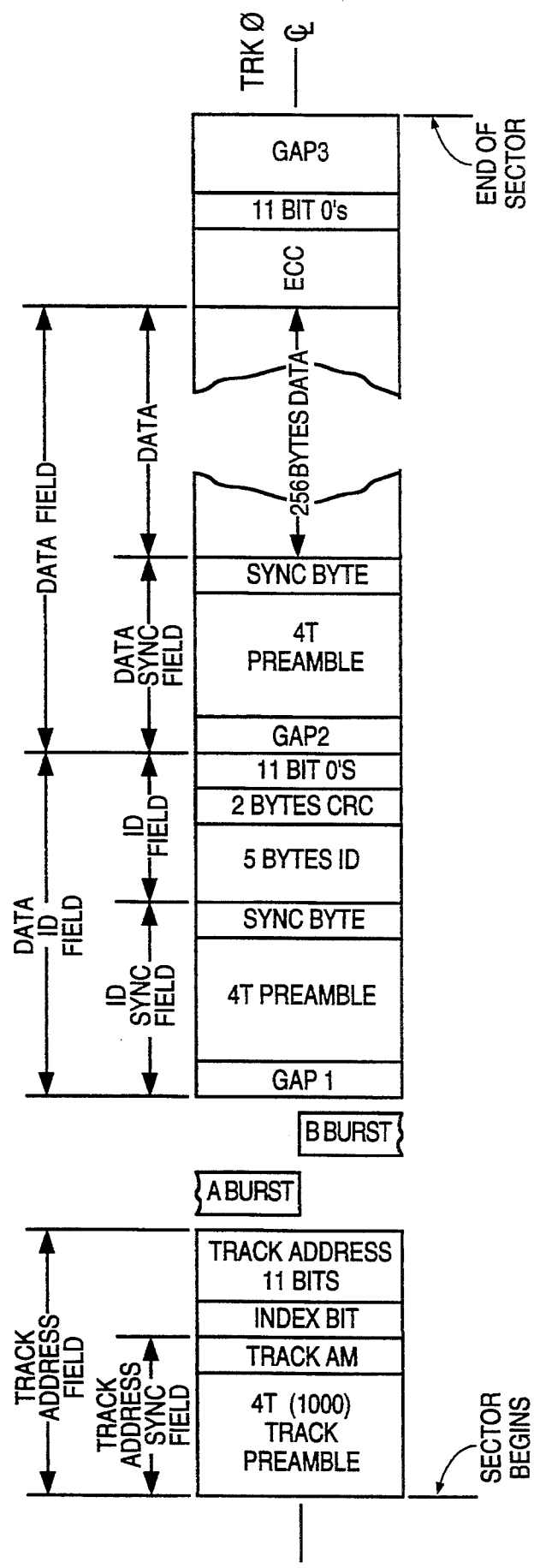
FIG. 2 is an exploded view of information included in each sector of each track on the disk surface.
Figure 3:
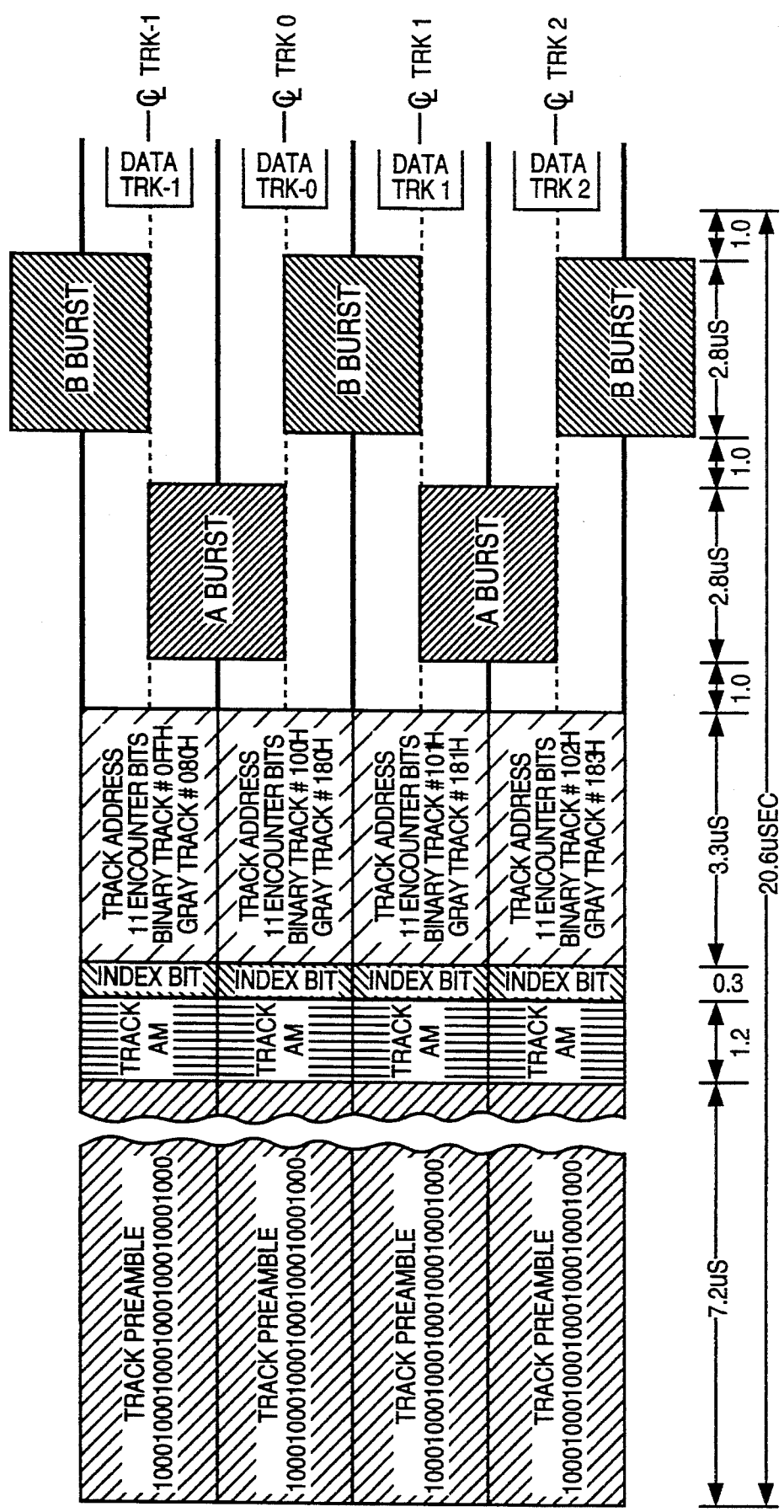
FIG. 3 is a more detailed illustration of four tracks within a sector illustrating the beginning of the sector through the A burst and B burst.

Turning to FIG. 2, a typical sector is illustrated and begins at the left-hand edge of the figure with a track preamble which consists of thirty-six data patterns of 1000. While FIG. 2 illustrates in detail the format of a complete sector, FIG. 3 illustrates in somewhat greater detail the track preamble, track address mark, index bit, track address and burst signals for four adjacent tracks. The track center lines are indicated by the $C_L$. The track preamble for each sector is common and extends from the outer periphery of the disk to the center of the disk and as illustrated in FIG. 3 is 7.2 microseconds long. The time is derived based on the existence of seventy-two sectors in each track in the disk rotating at 3204 revolutions per minute. Following the track preamble is a track address mark, indicated in the FIGS. as TRACK AM, which consists of a data pattern of data bits "1010" which is 1.2 microseconds in length. Following the track address mark an index bit is inserted to permit the identification of sector $\phi$ as distinguished from sectors 1 through 71. The index bit for sector $\phi$ is a data "1" with a data "0" being utilized for sectors 1 through 71. Following the index bit the track address is encoded on the surface of the disk and consists of eleven data bits. As is best illustrated in FIG. 3, the eleven data bits are utilized to indicate the track address which is recorded on the disk in Gray code, which is well known in the disk drive field. The data beginning with the start of the sector through the track address is recorded phase coherently radially across the surface of the disk as illustrated in FIG. 3. Following the track address after a space of 1 microsecond are A burst and B burst signals which are utilized in fine head positioning. These burst signals are spaced in a zig-zag pattern as viewed from the radially extending lines of the disk. Each burst pattern is 2.8 microseconds in length and consists of fourteen patterns of data bits "1000", which pattern is also sometimes referred to herein as a 4T pattern. As will best be appreciated by reference to FIG. 2, the head centered over the center line of track $\phi$ will encounter the A burst before the B burst, with the disk rotation as indicated by the arrow in FIG. 1.

Those skilled in the art will recognize that high performance disk drives commonly utilize run-length-limited codes for recording digital data on the magnetic disk. One example of a run-length-limited code is illustrated in U.S. Pat. No. 4,413,251 to Adler et al. issued Nov. 1, 1983, entitled "Method and Apparatus for Generating a Noiseless Sliding Block Code For A (1,7) Channel with Rate 2/3". In the present invention, the track address mark, the index bit and the eleven bits to identify the track address are recorded on the magnetic media according to a data encoding run length limited code 1/6 (2,8). The details of the 1/6 (2,8) run-length-limited code will be described hereinafter.

Returning to FIG. 2, after the A and B burst, gap 1 is provided and serves to allow for some timing jitter. Gap 1 is followed by the Data ID Field which identifies the track number, head number and sector number for the data to be recorded in the data field, As illustrated in FIG. 2, it will be appreciated that the Data ID Field is comprised of the ID Sync Field, which consists of one 4T preamble followed by a sync byte and the ID Field. In the ID Field, five bytes of ID information is provided, followed by two bytes of CRC (Cyclic Redundancy Code used for error detection of the ID Field) and eleven bits of zeros. The data bits for the Data ID field are recorded on the magnetic media in the ½ (2,7) run-length-limited code, as is the user data which is recorded in the Data Field. As will be appreciated by reference to FIG. 2, the Data Field is comprised of a Data Sync Field, which consists of gap 2 which is needed for timing jitter of rewrites, followed by 4T preamble (consisting of thirty-two 4 T's) and thereafter a sync byte. The balance of the Data Field consists of that portion of the track which is utilized for storage of user data. In the particular embodiment being described herein, the user data storage space in each sector is sufficient for storing 256 bytes of data. Following the Data Field a block for error correction code is provided, this being following by 11 bits of zeros and gap 3 which takes up timing jitter of writing circuitry and controller and disk speed variation.

One of the problems confronting the disk storage subsystem upon start-up is to identify the track over which the head is located. This problem in the prior art systems is compounded because both the track address and the other data on the disk are encoded using a common encoding scheme and therefore it is difficult to identify the track address during start-up. In the present invention, the unique 1/6 (2,8) recording code is utilized to encode data bits in the track address mark, the index bit and in the track address portion of each sector to simplify the identification of the absolute track address. Those skilled in the art may, at this point, be puzzled as why one would select the 1/6 (2,8) recording code for use in such a system since in terms of its recording efficiency it is rather inefficient. This appearance of inefficiency will be appreciated since for each data bit six code bits must be recorded on the disk surface. However, as will be appreciated after further consideration of the specification, the 1/6 (2,8) code lends itself quite well to use in the system of the present invention for providing the identification of the location of the track over which the head is located. The 1/6 (2,8) code has several advantages, which will be pointed out more fully hereinafter, including being close to the 2,7 code in terms of the read/write channel capabilities and the 1/6 (2,8) code used for the system of the present invention permits finding the track address without utilizing a data separator which was required in the prior art. Accordingly, the circuitry is simplified and has the additional advantage that an asynchronous may be used for decoding, because of the capability of operating in the presence of $\pm 1T$ time interval measurement uncertainty.

In the 1/6 (2,8) code, the "2" indicates the minimum number of zeros between a transition and the "8" denotes that there may be a maximum of 8 zeros between adjacent transitions. As noted above, the ratio between data bits and code bits is 1:6 and FIG. 4 illustrates the encoding utilized in the 1/6 (2,8). As will be appreciated by reference to FIG. 4, a data "0" is encoded into code bits 010000, and a data "1" is encoded 000010. Decoding of 1/6 (2,8) encoded data bits is performed using the decoding algorithm illustrated in FIG. 5, and as will be appreciated by reference to FIG. 5 involves the consideration of the data bit present from the previous decoding and the number of counts, or spaces, between the last code bit 1 and the succeeding code bit 1, For example, in Case 1 of FIG. 5 if the previous data bit was a "0" and the count between the preceding code bit 1 transition and the succeeding code bit 1 transition is a 6T (to indicate the count), then the succeeding data bit is a "0". The arrows in FIG. 5 are used to illustrate the beginning and end of the count. In Case 1 it will be appreciated that the count is 6T. The decoding system utilized in the present invention will be explained in detail below during the description of the operation of servo decoder 41 which is illustrated in FIG. 8. FIG. 5 will be utilized as an aid in explanation of the decoding circuitry. More particularly, servo decoder 41, which is a part of the disk file subsystem 12 illustrated in FIG. 7, will be fully explained and its operation discussed in the context of a small disk drive subsystem.

Figure 6:
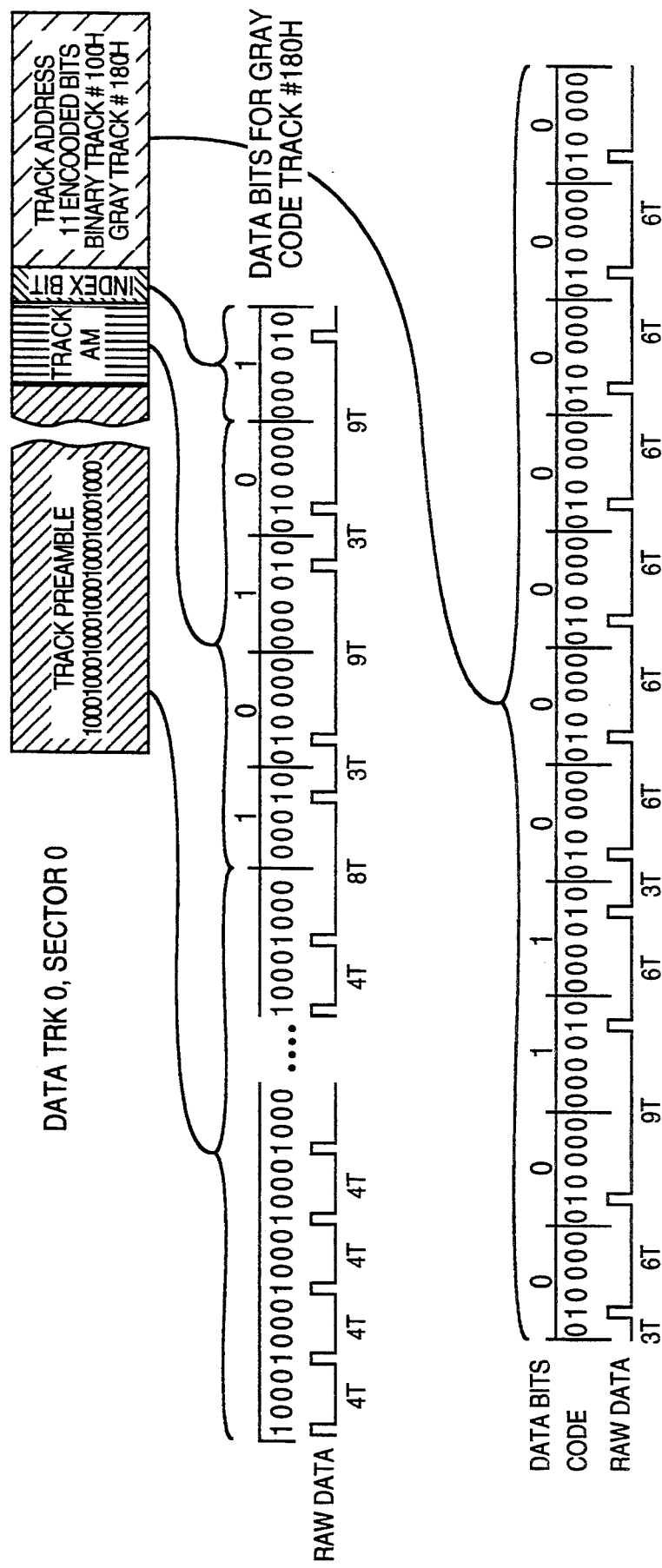
FIG. 6 is a diagram which illustrates the raw data for data track $\phi$ sector $\phi$ from the track preamble through the track address, the data bits for the track address mark, sector indication and Gray Code track address or track $\phi$.

To illustrate the utilization of the 1/6 (2,8) code and its use in the track address detecting system of the present invention, FIG. 6 illustrates an example of data track φ sector φ from FIG. 3, beginning with the preamble, where the sector begins, and extending through the track address. As mentioned previously, the track address is recorded on the magnetic media utilizing the Gray code which provides for simplified track identification. Gray code is well known in the prior art and does not require explanation. Referring to FIG. 6, the track preamble(which is abbreviated in length for simplification), track address mark, index bit and track address for data track φ, sector φ are illustrated, along with the details of the data bits, the transitions recorded on the disk surface and the raw data with transitions indicated that would be picked up by a magnetic head traveling above the surface of the disk over data track φ sector φ. As noted previously, the track preamble for each sector of each track is a 4T (1000) pattern repeated thirty-six times prior to the track address mark. The selection of thirty-six repetitions was made to allow time for AGC reset and fast SYNC and, as will be appreciated after further explanation of the invention, a lesser number of 4T transitions could be used. As noted with reference to FIG. 6, the 4T preamble is not encoded and is represented on the disk surface by a series of 1000 bits. The track address mark (abbreviated as TRACK AM in the Figures), which is also common to all tracks, is a data "1010" for each sector of each track, and may be thought of as the sector mark for the tracks, is encoded in the 1/6 (2,8) run-length-limited recording code according to the encoding algorithm illustrated in FIG. 4. In FIG. 6, the "1010" above the solid line in the TRACK AM field indicates the data bits for the track address mark. Directly beneath these data bits are the code bits recorded on the disk which comprise "000010" for each data "1" and "010000" for each data "0". To identify the first sector of the seventy-two sectors utilized in each track on the disk, the index bit for sector φ is given a data "1", which is converted into the pattern "000010" on the disk surface. For sectors one through seventy-one, the index bit is a data "0", which would of course be encoded as a "010000" pattern on the disk for those sectors. Following the index bit, the track address for data track φ in our example, which is a binary track #100H, which corresponds to Gray track #180H, is recorded on the disk using the Gray Code track address for #180H which in data bits is, as illustrated at the bottom portion of FIG. 6, 00110000000. The 1/6 (2,8) code for that address is indicated below the data bits and below that is the raw data signal is also provided. It will also be noted that in FIG. 6 the "T" count between transitions is indicated below the raw data signal line and this will be used hereinafter in the detailed explanation of the decoding of the track address with the system of the present invention.

Figure 7:
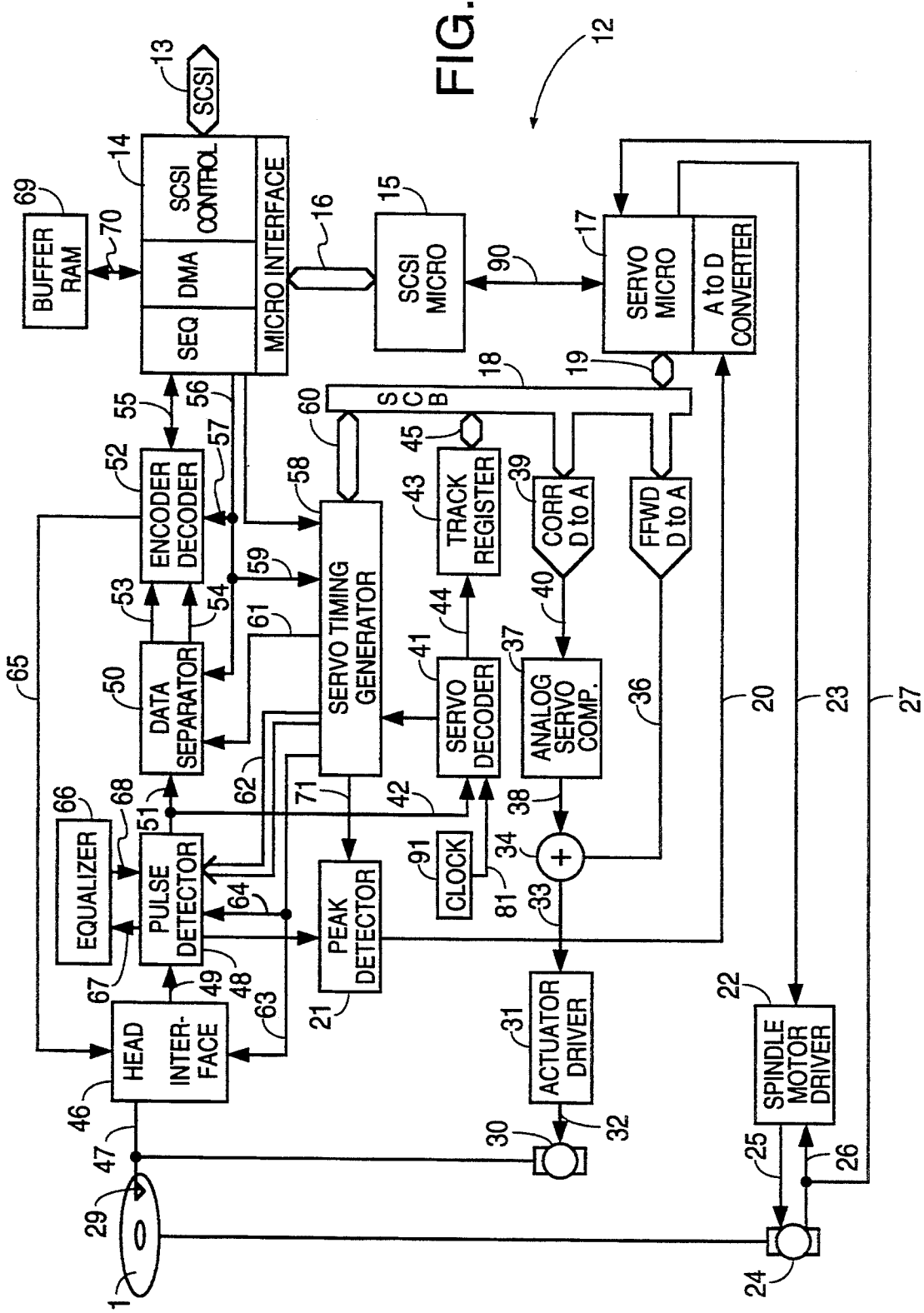
FIG. 7 is a system block diagram for a disk drive subsystem utilizing the track address detecting means and circuitry of the present invention.
Figure 8:
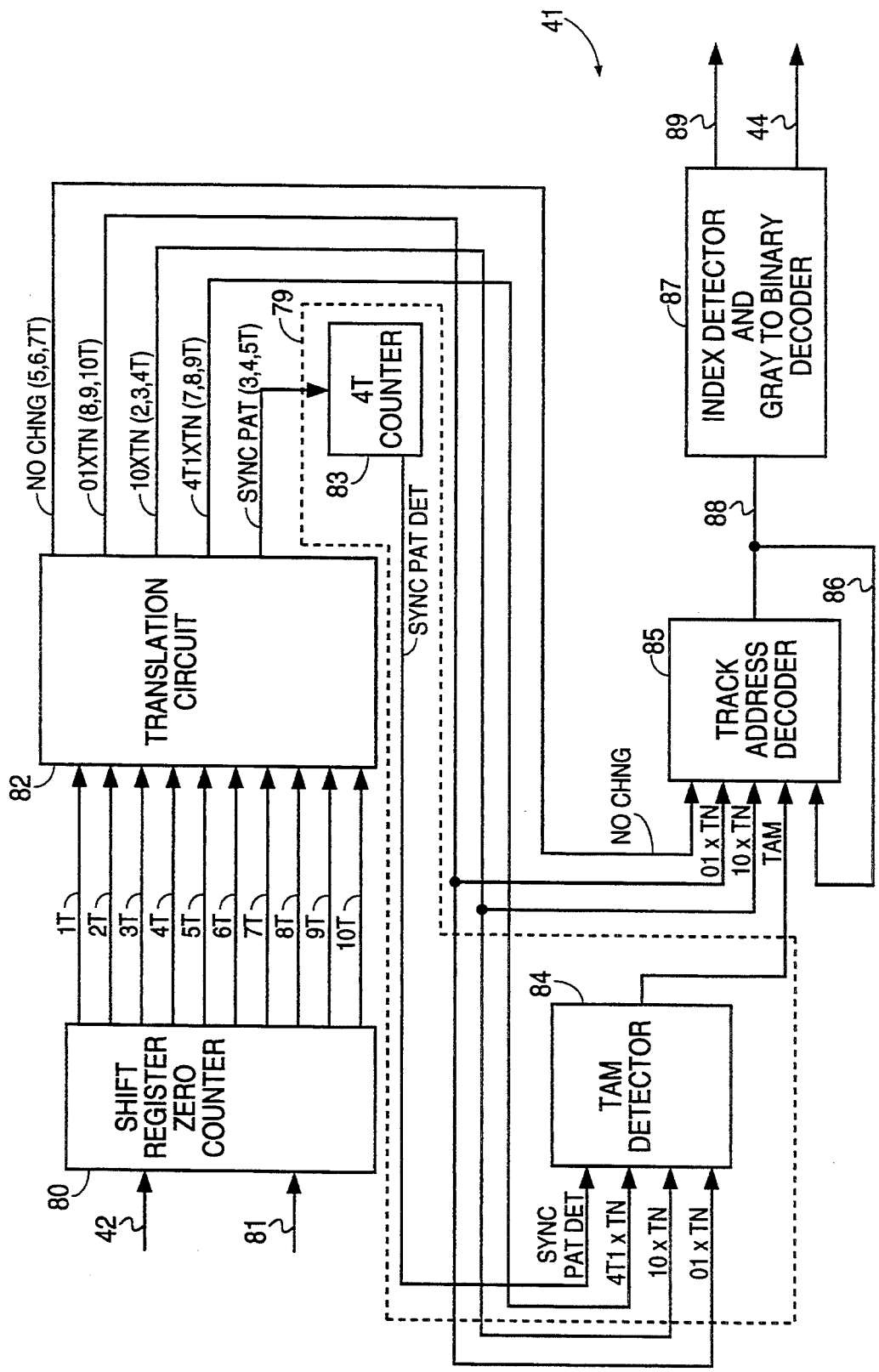
FIG. 8 is a block diagram of the servo decoder circuitry utilized in the disk drive subsystem illustrated in FIG. 7.

The track address decoding system of the present invention may be advantageously utilized in a system such as disk file subsystem 12 illustrated in FIG. 7. In the particular embodiment illustrated in FIG. 7, the disk file subsystem is utilized in connection with the storage and retrieval of digital data supplied over SCSI data bus 12. The SCSI bus is well known to those skilled in the art and is a standardized bus system as defined in SCSI ANSI X3.131—1986 CCS REV. 4B. SCSI bus 13 supplies information to and receives information from controller 14, which may be for example a controller chip set such as Adaptec No. AIC 610 and AIC 6250. In addition, controller 14 includes a micro interface which permits controller 14 to interface with SCSI microprocessor 15 over bidirectional bus 16. SCSI microprocessor 15 may be, for example, a Motorola 68HC11. As is well known to those skilled in the art, the data block number provided to controller 14 over the SCSI bus 13 is provided to SCSI microprocessor 15 where the block number is converted to cylinder number to identify the location from which data is required or to which data is to be written on the media. The cylinder number from SCSI microprocessor 15 is provided to servo microprocessor 17 over line 18. Servo microprocessor 17 converts the cylinder number received from SCSI microprocessor 15 into the binary track address which is provided to servo control bus 18 via bidirectional bus 19. Servo microprocessor 17 may be of the type provided by Motorola 68HC11. Included as part of servo microprocessor 17 is an A to D converter which receives fine servo position error signals over line 20 from peak detector 21. These fine error position signals are utilized to provide fine positioning of the head over the track once the desired track has been located. Servo microprocessor 17 provides motor control signals to spindle motor driver 22 over line 23, the signals being a "1" as a spin command and a "0" as a halt command. The spindle motor driver may be, for example, a standard circuit such as that provided by Hitachi America, Ltd. under part number HA 13441. Spindle motor driver 22 provides command signals to spindle motor 24 which may be, for example, a Shinano Tokki Corporation brushless DC motor, such signals being provided over line 25. Included within spindle motor 24 is circuitry to provide a signal indicative of the rotational speed of spindle motor 24 and such signal is provided to spindle motor driver 22 over line 26 and to servo microprocessor 17 over line 27. It will be noted that in FIG. 7 a single disk 1 is illustrated, however, it will of course be appreciated that typically small disk file subsystems utilize a plurality of disks with one or more heads for each surface.

For simplicity, a single magnetic recording head 29 is illustrated above the surface of disk 1. Magnetic recording head 29 is moved generally radially across the surface of disk 1 under the control of actuator 30 which may be for example a rotary or linear actuator of the type well known to those skilled in the art. Actuator 30 is physically connected to magnetic head 29. The position control signals to actuator 30 are provided by actuator driver 31 over control line 32. Actuator driver 31 may be for example a circuit such as that provided by Micro Linear, 2092 Concourse Drive, San Jose, Calif. 95131, and identified as Servo Driver ML4402. Actuator driver 31 receives both coarse and fine servo control signals over line 33 from summer 34 which receives an input from FFWD D to A converter circuit 35 over line 36 and control signals from analog servo COMP 37 over line 38. Control signals to analog servo COMP 37 are provided by CORR D to A converter 39 via line 40. As noted earlier, servo microprocessor 17 provides signals to servo control bus 18 based upon information received over line 90 from SCSI microprocessor 15, which information is provided to servo control bus 18 over bidirectional bus 19. Positioning of head 29 by actuator 30 is determined by the input signal over line 33 from summer 34. With a command over the SCSI bus 13 for the reading or writing of information onto magnetic disk 1, the commands to actuator driver 31 are a function of the present location of head 29 and the position to which head 29 needs to be moved for the next reading or writing of data. The appropriate control signals to actuator driver 31 to cause head 29 to be moved to the new track must be provided based upon the current track position, which is determined by signals from magnetic head 29 which reads the track address location from the track over which it is located. The track address information from head 29 is amplified by preamp 46, converted to binary logic levels by read channel 48, and is decoded by servo decoder 41, the details of which are illustrated in FIG. 8 and which will be fully described hereinafter. Servo decoder 41 receives raw data pulses over line 42, such raw data being RZ data as illustrated in FIG. 6 for example, and decoder 41 converts that raw data to the binary track address which is then provided to track register 43 over line 44. Track register 43 provides the binary track address to servo control bus 18 over bus 45 and the binary track address is utilized by servo microprocessor 17 in connection with seek commands from the host CPU received over SCSI bus 13.

Magnetic recording head 29 reads data transitions from the surface of disk 1 and provides those signals to preamp 46 over line 47. A suitable head interface for signals from magnetic recording head 29 would be one for example as manufactured by Silicon Systems, 14351 Myford Road, Tustin, Calif. 92680, and given part number SSI 511. Amplified signals from head interface 46 are supplied to read channel pulse detector 48, which may be for example a National Semiconductor DP8468B Disk Pulse Detector and Embedded Servo Detector from National Semiconductor, 2900 Semiconductor Drive, Santa Clara, Calif. 95052. The output of pulse detector 48 comprises raw digital data which is supplied to data separator 50 over line 51, and as previously described raw data from pulse detector 48 is also provided to servo decoder 41 over line 42. A suitable data separator for use in disk file subsystem 12 of the present invention would be of the type manufactured by National Semiconductor and given part number DP8459B data synchronizers. Data separator 50 (National Semiconductor part number DP8459B) provides read data to encoder-decoder 52 via line 53 and also provides read clock signals to encoder-decoder 52 over line 54. A suitable encoder decoder 52 for use in the present invention would be one of the type supplied by National Semiconductor such as part number DP8463B (2,7) ENDEC. Encoder decoder 52 utilizes the ½ (2,7) run-length-limited recording code which is utilized in the recording of data on surface of disk 1 and which is also used formatting the Data ID Field. Data to be stored on the disk surface and data which is retrieved from the disk surface is communicated between encoder-decoder 52 and controller 14 over line 55.

When a read operation is to be performed, a read command is issued by controller 14 over line 56 and the read command signal is provided to data separator 50 via line 56, and also to encoder decoder 52 over line 57 and to servo timing generator 58 over line 59. Servo timing generator 58 may be implemented using digital integrated circuitry using well known digital design techniques to achieve the functions illustrated in FIG. 8. Commands to and from servo timing generator 58 from servo control bus 18 are communicated over bidirectional bus 60. In addition, servo timing generator 58 provides PLL HGD (Phase locked Loop High Gain disable) to data separator 50 over line 61. Read channel amplifier 48 receives control signals AGC FAST (Automatic gain control fast acquire), AGC reset signals and AGC HOLD command signals from servo timing generator 58 over bus 62.

For writing data onto disk 1, when the specified location on the disk has been identified, a write command is issued from servo timing generator 58 over line 63 to preamp 46, and the write command is also provided to read channel amplifier 48 over line 64. The data to be written on disk 1 is provided by encoder decoder 52 to head interface 46 over line 65 to the write driver in head interface 46 which writes the signals on the disk through recording head 29.

In connection with the operation of read channel amplifier 48, equalizer 66 functions to provide pulse shaping. The communications between equalizer 66 and read channel amplifier 48 are provided over lines 67 and 68.

In the operation of controller 14, the customer data provided over SCSI bus 13 may exceed the capabilities of the buffer in controller 14 in terms of data storage and, accordingly, buffer RAM 69 is provided for storing additional data. Buffer RAM 69, which may be, for example, a Hitachi Part No. HM 62256, 32KX8 static RAM, available from Hitachi America, Ltdl, 2210 O'-Toole Avenue, San Jose, Calif. 95131, is utilized to store information for processing by controller 14. Data flow between buffer RAM 69 and controller 14 is accomplished over bidirectional line 70.

In the operation of the fine servo controls to keep the head 29 on track, it is necessary to provide gating signals to peak detector 21 from servo timing generator 58 by line 71 since the A and B burst signals are offset in time and the command of whether to move toward the ID or OD of the disk varies depending on whether an odd or even numbered track is being followed. Those gating signals are provided by servo timing generator 58 to peak detector 21 over line 71. For example, for even numbered tracks, the A burst is nearer the OD of the disk and the B burst is nearer the ID. The converse is true for odd numbered tracks and in order to insure that the control signals to actuator driver 31 operate in the appropriate direction, the gating signals are required.

FIG. 8 is a block diagram illustrating the details of the servo decoder 41. The operation of servo decoder 41 will be explained using data track $\phi$, sector $\phi$, illustrated in FIG. 6, as an example of how the numerical track address is obtained based on the raw data pattern recorded on the surface of disk 1. In connection with the illustration, it will be assumed that magnetic head 29 is located above data track $\phi$, sector $\phi$ in the preamble portion of that sector. The inputs to servo decoder 41 include line 42, which provides raw data to shift register zero counter 80, and a system clock signal from clock 91 which is provided to shift register zero counter 80 via line 81. The preferred embodiment combines servo timing generator 58, servo decoder 41 and track register 43 into a single logic gate array. The system clock is located in this gate array and line 81 provides connection from the system clock 91 to shift register zero counter 80. Clock cycles from system clock 91 define the time interval "T". It will be noted that the outputs from shift register zero counter 80 comprise lines indicated by "1T" through "10T", which correspond to the expected clock cycles between data transitions from disk 1. It will be recalled that the input to servo decoder 41 on line 42 is RZ raw digital data as illustrated in FIG. 6 for example. Shift register zero counter 80 provides an output on the appropriate "T" line indicating the number of counts between the last transition and the subsequent transition; thus for example, when magnetic recording head 29 is in the preamble section of a sector, the raw data to shift register zero counter 80 is a series of 4T patterns (1000), and line 4T goes high upon the receipt of a successive "1". After a "1" is received by shift register zero counter 80, shift register zero counter 80 is reset and begins counting anew and based on the clock cycles to the receipt of the next "1"/raw data transition, provides a subsequent high signal on the "T" line corresponding to the count since the last transition. The 1T through 10T outputs from shift register zero counter 80 are provided as inputs to translation circuit 82. Based on the inputs from shift register zero counter 80, translation circuit 82 provides an output on applicable output line, the first of which is indicated NO CHNG (5,6,7T), the second line of which is denoted 01XTN (8,9,10T), the third line 10XTN (2,3,4T), the fourth 4T1XTN (7,8,9T) and the last SYNC PAT (3,4,5T).

As pointed out earlier, the 1/6 (2,8) run-length-limited recording code used in the present invention is somewhat inefficient as a means for encoding data since one data bit requires the encoding on the disk of six code bits. This inefficiency, however, has great advantage in terms of providing a track address decoding system since, as will be illustrated, a great deal of robustness is built into the track address decoding system by the use of the 1/6 (2,8) code. As will be noted by reference to FIG. 8, a deviation of one count in either direction from a center point, for example the 6 in the NO CHNG output line from translation circuit 82 will still provide an indication that there is no change from the previous data bit to the succeeding data bit and therefore any irregularities such as loss of as much as one count will not affect the accuracy of the decoding. In similar fashion, the 01XTN, the 10XTN, the 4T1XTN as well as the SYNC PAT output lines from translation circuit 82 denote a one count variation as an acceptable indication of an output for that corresponding occurrence. It will also be appreciated by reference to FIG. 8 that translation circuit 82 logically performs a grouping of input lines 1T through 10T so that an input on any one of a line within the group provides a corresponding output on the output lines from translation circuit 82. Referring back to FIG. 6, it will be recalled that the track address is preceded by a track preamble and track address mark and before decoding the track address a true track address sync field must be identified. This function is performed in servo decoder 41 by track address synchronization field detection circuit 79 included within the dashed line portion of FIG. 8, track address synchronization field detection circuit 79 comprising 4T counter 83 and TAM detector 84.

Output line SYNC PAT (3,4,5T) from translation circuit 82 is connected to 4T counter 83. 4T counter 83 identifies, based upon the receipt of successive groups of 4T data patterns, that magnetic head 29 is in the preamble portion of a track. As mentioned previously, the number of 4T counts utilized to indicate a true preamble was selected somewhat arbitrarily, and a number other than four 4T data patterns may be utilized. After receiving four 4T counts, the output on SYNC PAT DET line to TAM detector 84 goes high, providing the first of five conditions which must be true in order to indicate the detection of a true TRACK AM (or TAM). After SYNC PAT DET line to TAM detector 84 goes high, the next input required by TAM detector 84 for a true track address mark is an 8T count which is indicated by a 4T1XTN output from translation circuit 82, indicating that there has been transition from 4T to a data bit "1". It will be observed by referring to FIG. 6 that the 8T count indicates that the preamble has ended and the data bit 1, which is the first data bit in the track address mark, is identified. This satisfies the second of the five conditions required to identify a track address mark. Referring to FIG. 6, after the data "1" in a track address mark has been identified, the next count between 1's is a 3T, which is input to translation circuit 82 from shift register zero counter 80, resulting in an output from translation circuit 82 on line 10XTN, indicating that there has been a transition from a data "1" to a data "0" thus satisfying the third condition for TAM detector 84 in the identification of a true track address mark. The next count from shift register zero counter 80 will be a 9T resulting in an output of a high signal from translation circuit 82 on line 01XTN which is input to TAM detector 84 as the fourth condition required in identifying a true track address mark. The next input to translation circuit 82 from shift register zero counter 80 is a 3T (as illustrated in FIG. indicating that there is transition from data "1" to data "0" thus the output from translation circuit 82 is on line 10XTN which is the fifth and final condition indicating that a true track address mark has been located and line TAM from TAM detector 80 goes high, providing an enabling signal to track address decoder 85.

It will of course be appreciated by those skilled in the art that TAM detector 84 may be implemented with logic circuitry suitable to provide an output on TAM line if the inputs to TAM detector 84 occur in the following order: SYNC PAT DET, 4T1XTN, 10XTN, 01XTN and 10XTN. Any suitable logic circuitry for providing an output on the TAM line of TAM detector 84 if and only if that order of signals is received on the input would be suitable for implementing TAM detector 84.

With track address decoder 85 enabled by the TAM signal, track address decoder 85, based on inputs on lines NO CHNG, 01XTN, 10XTN and feedback from line 86, converts the raw data transitions (which provide the "T" counts) of the track address and the index bit which are recorded on magnetic disk 1 in the 1/6 (2,8) code into the Gray code track address and the index bit output, all of which are provided to index detector and Gray to binary decoder 87 over line 88. The output from index detector and Gray to binary decoder 87 on line 44 is the binary track address which is provided to track register 43. The second output from index detector and Gray to binary decoder 87 is provided on line 89 to controller 14 and is the indication that the index bit is a data "1", indicating that the head is over sector $\phi$.

With respect to identifying the index bit, in the present example after the TAM line to track address decoder 85 goes high, the count from shift register zero counter 80 is 9T, resulting in an output from translation circuit 82 on line 01XTN producing a high output on line 88 to index detector and Gray to binary decoder 87, resulting in a high output on line 89 denoting the head is over sector $\phi$. The signal on line 89 is provided to controller 14.

Track address decoder 85 decodes the transition indications (01XTN or 10XTN) or NO CHNG inputs from translation circuit 82 in accordance with the decoding algorithm illustrated in FIG. 5. For example, after the index bit of data "1" for sector φ, the output on line 88, and thus the feedback on line 86 to track address decoder 85, is a data "1" so the first input to track address decoder 85 is that we have a "1" and track address decoder 85 then, based upon the input from 10XTN output line from translation circuit 82, which results due to the 3T count as illustrated in FIG. 6, provides an output on line 88 of data "0". This will be the result of the fact that we are in Case 3 on FIG. 5 and that we have a "1", the count is 3T between transitions, thus the next data bit is a data "0". The "0" output on line 88 is fed back over line 86 to track address decoder 85 and with a 6T count we are in the case that we have a "0" and with a 6T count the next data bit is a "0" (Case 1). If the index bit were a data "0", indicating that the head was over one of sectors 1 through 71, the encoded transition pattern on the disk in the index bit area would be 010000, resulting in a count of 6T which would in FIG. 5 be Case 1 because we have a "0" (index bit) a 6T count is received and thus the next data bit is a "0", thus demonstrating that the first data bit in the Gray track code is a "0" as was the case when we were in sector φ.

Thus continuing the decoding of the Gray code on disk surface for data track φ, sector φ with the first data bit of the Gray code track address being data "0", track address decoder 85 has the "0" input on line 86, a 6T count is received from shift register zero counter 80 via translation circuit 82, resulting in an output on line NO CHNG. It will be appreciated by reference to FIG. 5 this is decoded by track address decoder 85 under Case 1 as having a "0" and receiving a count of 6T, yielding a data "0" as the next data bit. Decoding of the track address continues as indicated above and results in the Gray code track address for track number 180H, which corresponds to data bits 0011000000 (as illustrated in FIG. 6) which are input to index detector and Gray to binary decoder 87. Index detector and Gray to binary decoder 87 converts the Gray code track address to the binary track address which is provided to track register 43 over line 44. Circuitry in index detector and Gray to binary decoder 87 for converting Gray code to binary is well known to those skilled in the art and is accomplished by utilizing an exclusive OR gate and a shift register having the proper number of bits.

From the foregoing, it will be appreciated that a unique and highly advantageous system and circuitry is provided for the identification of the absolute track address of a track on a recording medium which provides significant advantages over those of the prior art.

Those skilled in the art will appreciate that various modifications may be made to the foregoing without departing from the spirit and scope of the invention. It is also, of course, understood that the scope of the invention is not determined by the above description, but only by the following claims.

We claim:

1. A circuit for receiving track address information comprised of digital signals from a recording medium and converting said information into a numerical track address, wherein said track address information includes track address synchronizing information, said circuit comprises:

first circuit means having an input for receiving said track address information and a plurality of output terminals each one of which is designated to exclusively provide an output signal indicative of the time interval since the receipt of the preceding digital logic transition, said first circuit means further including means for measuring the relative time interval between said digital signals and providing an output signal to the one of said plurality of output terminals corresponding to the measured interval;

translation circuit means having a plurality of input terminals connected to the output terminals of said first circuit means, said translation circuit having a plurality of output terminals, said translation circuit including means for grouping predetermined ones of said input terminals of said translation circuit with respect to one or more output terminals of said translation circuit so that an output signal is provided on one or more of said output terminals in response to receipt of a signal on an input terminal of one of said input terminals in its corresponding group;

track address synchronization information detecting means having input terminals connected to output terminals of said translation circuit and having an output terminal, said track address synchronization information detecting means including means responsive to receipt of signals from said translation circuit to provide an output signal at its output terminal indicative of receipt of track address synchronization information; and track address decoder circuit means having a plurality of input terminals, means connecting one of said input terminals to the output terminal of said track address synchronization information detecting means and means connecting others of said plurality of input terminals to predetermined ones of the output terminals of said translation circuit, whereby in response to receipt of a signal from said track address synchronization information detecting means and receipt of signals from said translation circuit means the track address decoder circuit generates the numerical track address represented by the digital signals from said recording medium.

2. A circuit according to claim 1, wherein said track address synchronizing information includes a plurality of common repeated time interval patterns followed by a predetermined pattern of time intervals between successive digital signals and said track address synchronization information detecting means includes counting means connected to said translation circuit for providing an output signal in response to receipt of a predetermined number of said common time interval patterns and wherein said track address synchronization information detecting means further includes logic circuit means connected to the output of said counting means and to said translation circuit means whereby upon receipt of an output signal from said counting means and receipt of signals from said translation circuit means indicative of said predetermined pattern of time intervals said logic circuit means provides a signal at the output of said track address synchronization information detecting means.

3. A circuit according to claim 2, wherein that portion of said track address information on said recording medium which provides the numerical track address is encoded according to a run-length-limited recording code and said track address decoder circuit means includes logic circuit means operative according to a decoding algorithm for generating the numerical track address.

4. A circuit according to claim 3, wherein said run-length-limited recording code is a 1/6 (2,8) code.

5. A circuit according to claim 4, wherein a portion of said track address synchronizing information is recorded on said recording medium according to a 1/6 (2,8) run-length-limited recording code.

6. A circuit according to claim 1, wherein that portion of said track address information on said recording medium which provides the numerical track address is encoded according to a run-length-limited recording code and said track address decoder circuit means includes logic circuit means operative according to a decoding algorithm for generating the numerical track address.

7. A circuit according to claim 6, wherein said run-length-limited recording code is a 1/6 (2,8) code.

8. A circuit according to claim 7, wherein a portion of said track address synchronizing information is recorded on said recording medium according to a 1/6 (2,8) run length limited recording code.

* * * * *